United States Patent
Kim et al.

(10) Patent No.: US 9,147,124 B2
(45) Date of Patent: Sep. 29, 2015

(54) METHOD OF DETECTING TRANSITION AREA AND APPARATUS FOR PROCESSING IMAGE USING THE SAME

(71) Applicant: Anapass Inc., Seoul (KR)

(72) Inventors: Daehyun Kim, Seoul (KR); Tae Jin Kim, Seoul (KR); Jae Hun Lee, Seoul (KR)

(73) Assignee: ANAPASS INC., Seoul (KR)

( * ) Notice: Subject to any disclaimer, the term of this patent is extended or adjusted under 35 U.S.C. 154(b) by 0 days.

(21) Appl. No.: 14/492,135

(22) Filed: Sep. 22, 2014

(65) Prior Publication Data

US 2015/0110393 A1    Apr. 23, 2015

(30) Foreign Application Priority Data

Oct. 18, 2013    (KR) .......................... 10-2013-0124488

(51) Int. Cl.
*G06K 9/34*    (2006.01)
*G06K 9/46*    (2006.01)

(52) U.S. Cl.
CPC ................ *G06K 9/4652* (2013.01); *G06K 9/34* (2013.01)

(58) Field of Classification Search
None
See application file for complete search history.

(56) References Cited

U.S. PATENT DOCUMENTS

| 2003/0086018 A1* | 5/2003 | Berman et al. ................. 348/584 |
| 2007/0031039 A1* | 2/2007 | Gallafent et al. ............. 382/173 |
| 2013/0308851 A1* | 11/2013 | Bertens ......................... 382/132 |
| 2014/0147057 A1* | 5/2014 | Zhai .............................. 382/266 |

* cited by examiner

*Primary Examiner* — Li Liu
(74) *Attorney, Agent, or Firm* — Paratus Law Group, PLLC

(57) ABSTRACT

Provided are a method of detecting a transition area and an apparatus for processing an image using the same. The apparatus includes a line representative value calculator configured to calculate line representative values of an image including a non-image display area, an image display area, and a transition area interposed between the non-image display area and the image display area, and a transition area detector configured to calculate first-order and second-order differentiations of the line representative values, calculate a threshold value of the transition area using first-order and second-order-differentiation-representative-values of a first line group including a plurality of lines in a window including a plurality of lines and first-order and second-order-differentiation-representative-values of a second line group including a plurality of lines, and detect the transition area.

34 Claims, 10 Drawing Sheets

(a)

(b)

METHOD OF DETECTING TRANSITION AREA AND APPARATUS FOR PROCESSING IMAGE USING THE SAME

CROSS-REFERENCE TO RELATED APPLICATION

This application claims priority to and the benefit of Korean Patent Application No. 2013-0124488, filed on Oct. 18, 2013, the disclosure of which is incorporated herein by reference in its entirety.

BACKGROUND

1. Field of the Invention

The present invention relates to a method of detecting a transition area and an apparatus for processing an image using the same.

2. Discussion of Related Art

When image information input to a display device and the display device for displaying the image do not correspond to each other in terms of resolution or an aspect ratio, which is the ratio of the number of horizontal pixels to the number of vertical pixels, an existing image-processing apparatus displays black letterboxes above and below the image displayed on the display device or displays black pillar boxes to the left and right of the image. Also, to display a low-resolution image on a display device having a higher resolution, the existing image-processing apparatus performs upconversion.

SUMMARY OF THE INVENTION

According to related art, when a scaler upconverts a low-resolution image to display the low-resolution image on a high-resolution display device, the edges of an area in which an image is displayed and an area in which no image is displayed are mixed together and blurred as shown in FIG. 1. As a result, in the process of calculating the boundary between the non-image display area in which no image is displayed and the image display area in which an image is displayed, a blurry transition area is included in one of the image display area and the non-image display area and processed. Therefore, when image data is processed by an image processing apparatus, such as an image processor, an image displayed in an image display area may be degraded by a transition area, or a non-image display area may be damaged by a transition area.

The present invention is directed to providing a transition area detection method and an image processing apparatus capable of detecting a blurry transition area interposed between an area in which an image is displayed and an area in which no image is displayed as an independent area when image processing, such as upconversion by a scaler, is performed on the image.

The present invention is also directed to providing a transition area detection method and an image processing apparatus capable of improving the quality of an image displayed on a display device by separately performing image processing on an area in which no image is displayed, an area in which the image is displayed, and a transition area.

According to an aspect of the present invention, there is provided a method of detecting a transition area, the method including: calculating line representative values of an image to detect an edge of a first area; calculating first-order differentiations of the line representative values to detect a second area; and aligning the edge of the first area and the second area to detect a transition area.

According to another aspect of the present invention, there is provided a method of detecting a transition area, the method including: calculating line representative values of an image to detect a first area; calculating second-order differentiations of the line representative values to detect a third area; and aligning the first area and the third area to detect a transition area.

According to another aspect of the present invention, there is provided an apparatus for processing an image, the apparatus including: a line representative value calculator configured to calculate line representative values of an image including an image display area, an non-image display area, and a transition area interposed between the image display area and the non-image display area; a transition area detector including a first area detection sub-unit configured to detect a first area using the calculated line representative values, a second area detection sub-unit configured to detect a second area using first-order differentiations of the calculated line representative values, and a transition area detection sub-unit configured to detect the transition area based on the first area and the second area; and an image processor configured to separately perform image processing on the non-image display area, the transition area, and the image display area of the image.

According to another aspect of the present invention, there is provided an apparatus for processing an image, the apparatus including: a line representative value calculator configured to calculate line representative values of an image; a transition area detector including a first area detection sub-unit configured to detect a first area using the calculated line representative values, a third area detection sub-unit configured to detect a third area using second-order differentiations of the calculated line representative values, and a transition area detection sub-unit configured to detect a transition area based on the first area and the third area; and an image processor configured to separately perform image processing on an non-image display area, the transition area, and an image display area of the image.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
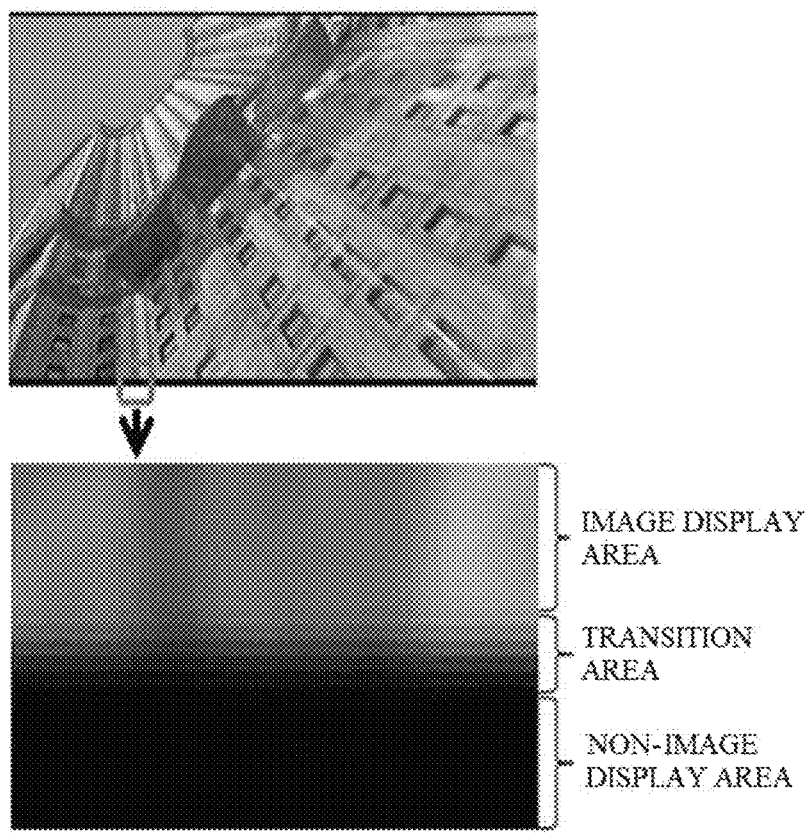
FIG. 1 is a diagram showing an image display area, a non-image display area, and a transition area.

Specific structural and functional details disclosed herein are merely representative for purposes of describing the exemplary embodiments of the present invention, and the present invention may be embodied in many alternate forms and should not be construed as limited to the exemplary embodiments of the present invention set forth herein. Accordingly, while the present invention is susceptible to various modifications and alternative forms, specific embodiments thereof are shown by way of example in the drawings and will herein be described in detail. It should be understood, however, that there is no intent to limit the present invention to the particular forms disclosed, but on the contrary, the present invention is to cover all modifications, equivalents, and alternatives falling within the spirit and scope of the present invention.

The terminology used in this specification should be understood as follows. The singular forms "a," "an," and "the" are intended to include the plural forms as well, unless the context clearly indicates otherwise. It will be further understood that the terms "comprises," "comprising," "includes," and "including," when used herein, specify the presence of stated features, integers, steps, operations, elements, parts, or combinations thereof, but do not preclude the presence or addition of one or more other features, integers, steps, operations, elements, parts, or combinations thereof.

It should also be noted that in some alternative implementations, the functions/operations noted in the blocks may occur out of the order noted in the flowcharts. For example, two blocks shown in succession may in fact be executed substantially simultaneously or the blocks may sometimes be executed in the reverse order, depending upon the functionality/acts involved.

Unless otherwise defined, all terms used herein have the same meaning as commonly understood by those of ordinary skill in the art to which the present invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2A:
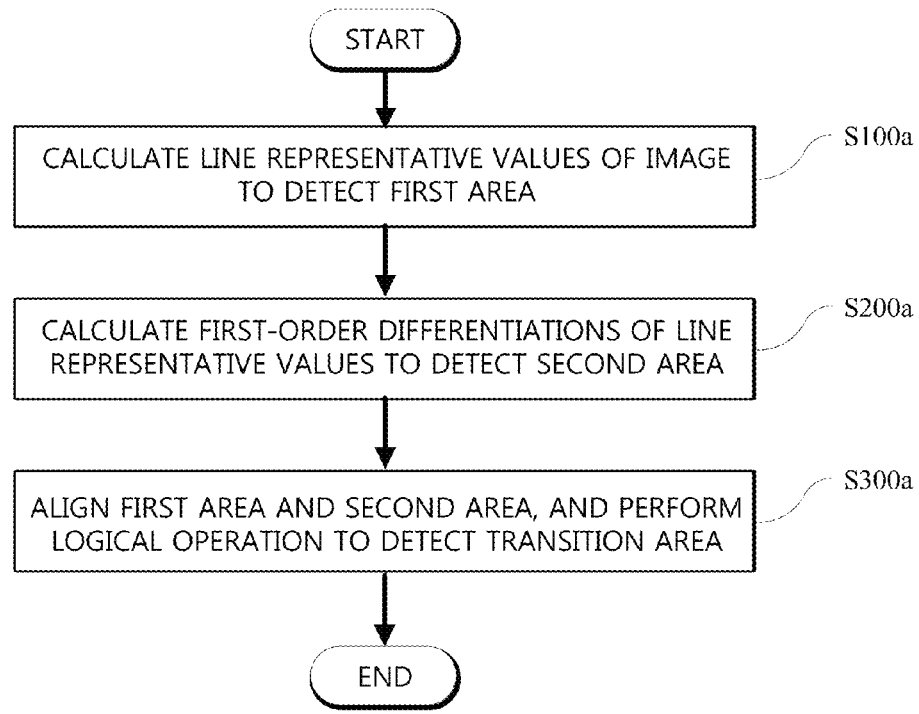
FIGS. 2A and 2B are flowcharts illustrating methods of detecting a transition area according to exemplary embodiments.
Figure 2B:
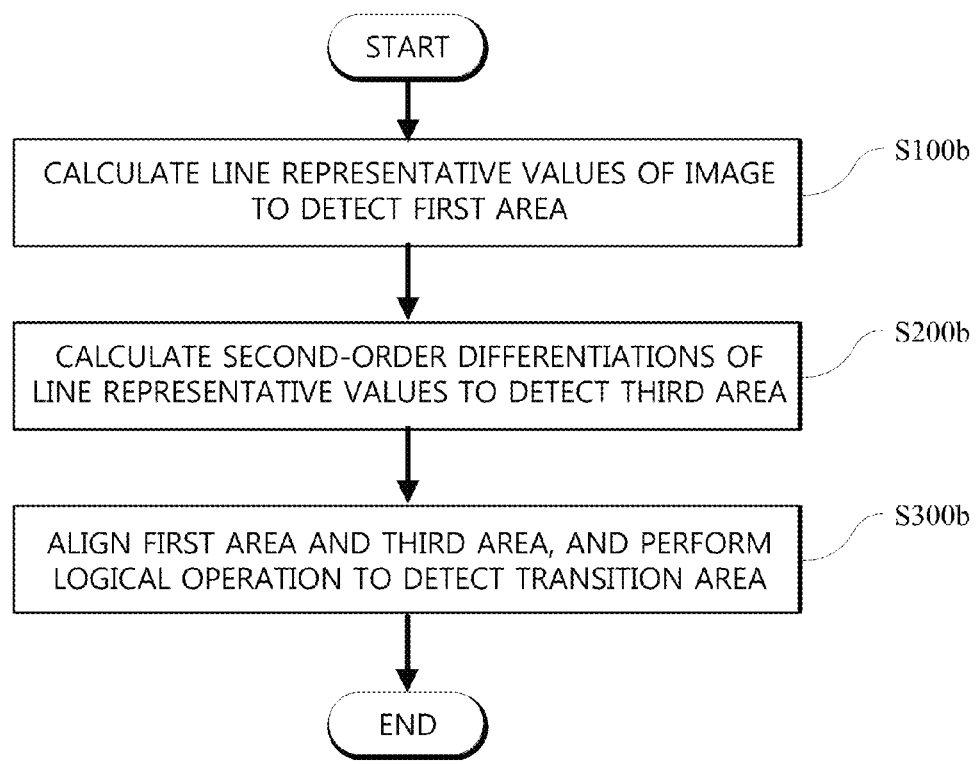

Hereinafter, an apparatus and method for processing an image according to exemplary embodiments of the present invention will be described with reference to the accompanying drawings. FIGS. 2A and 2B are flowcharts illustrating methods of detecting a transition area according to exemplary embodiments of the present invention. Referring to FIG. 2A, a method of detecting a transition area according to an exemplary embodiment of the present invention includes calculating line representative values of an image to detect a first area, calculating first-order differentiations of the line representative values to detect a second area, and aligning the edge of the first area and the second area and performing a logical operation to detect a transition area. Also, referring to FIG. 2B, a method of detecting a transition area according to another exemplary embodiment of the present invention includes calculating line representative values of an image to detect a first area, calculating second-order differentiations of the line representative values to detect a third area, and aligning the first area and the third area to detect a transition area.

Line representative values of an image are calculated (S100a and S100b). The image includes letterboxes displayed above and below an image display area in the form of a black band. Also, the image includes pillar boxes displayed to the left and right of the image display area in the form of a black column. To detect a transition area interposed between an non-image display area in which no image is displayed and the image display area, the representative values of pixels included in lines extending in a direction in which the non-image display area extends are calculated.

Figure 3:
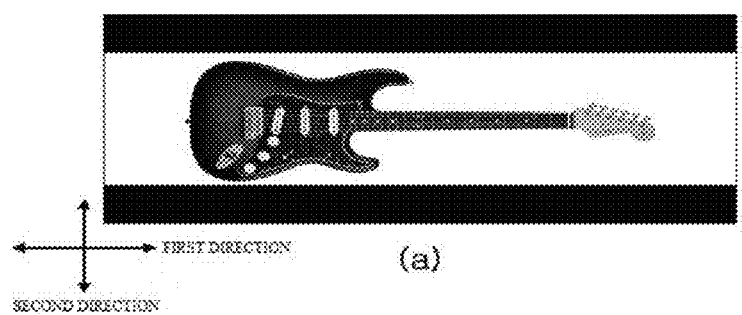
FIG. 3 is a diagram exemplifying cases in which non-image display areas are displayed in the form of a letterbox and a pillar box.
Figure 3:
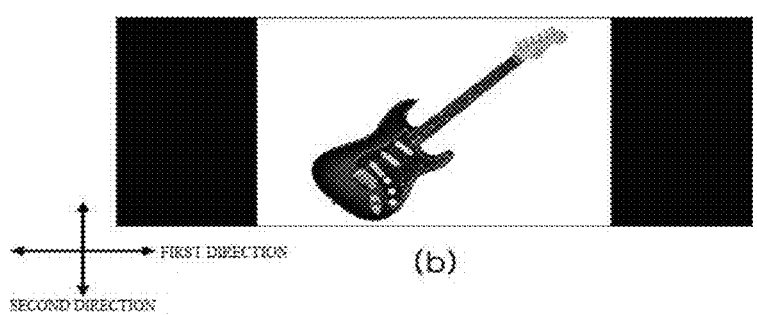

As an example, when non-image display areas are letterboxes extending in a first direction as shown in FIG. 3A, color information values of pixels included in first-direction lines of an image are obtained. As another example, when non-image display areas are pillar boxes formed in a second direction as shown in FIG. 3B, color information values of pixels included in second-direction lines of an image are obtained.

In the case of an image having both letter boxes and pillar boxes, operations, which will be described below, are performed on any lines between the first-direction lines and the second-direction lines, and then the same operations are performed on the other-direction lines, so that a transition area may be detected. Alternatively, the operations may be performed on the first-direction lines and the second-direction lines at the same time.

A display device for displaying an image has a display area having a fixed aspect ratio, such as 16:9 or 4:3. The display device has scan lines extending parallel in the second direction and data lines extending parallel in the first direction, thus driving pixels in the display area. In this embodiment, a line denotes a scan line or a data line extending in any one direction in a display device, and pixels included in a line denote pixels connected to the same scan line or the same data line.

A line representative value is calculated from color information values of pixels included in a line. As an example, when a total of 1920 pixels are included in a line of FIG. 3A, the representative value of the line is calculated using the entire or a part of luminance information of the total of 1920 pixels. A luminance value may be obtained from a gray scale value, a luminance value that is one element of the hue-saturation-luminance (HSL) color space, a luminance value that is one element of the YCbCr (luminance and chrominance information) color space, and a luminance value in the YUV (luminance, blue-luminance difference, and red-luminance difference) color space.

According to another exemplary embodiment, a line representative value may be calculated using elements other than luminance, luminance and the other elements, etc., such as a gray scale value, information on any one color in the HSL color space, information on any one color in the YCbCr (luminance and chrominance information) color space, and information on any one color in the YUV (luminance, blue-luminance difference, and red-luminance difference) color space.

A line representative value is obtained by performing arithmetic processing on color information values of a plurality of pixels included in a line. According to an exemplary embodiment of calculating a line representative value, any one value among the minimum value, the maximum value, the mode value, the median value, the summation, the weighted sum, the arithmetic mean, the weighted average, and the geometric average of color information of a plurality of pixels included in one line may be calculated to obtain a line representative value.

Description of exemplary embodiments will be made below assuming that the arithmetic mean of luminance of pixels included in a line is used as a line representative value. However, this is intended not for limiting the scope of the present invention but for brief and clear description of the present invention. Also, it is possible to calculate a line representative value by performing arithmetic processing other than calculation of arithmetic mean on the aforementioned other color information.

In an exemplary embodiment, pixels included in an non-image display area displayed in black in the form of a letterbox or a pillar box as shown in FIGS. 3A and 3B has a luminance of about 16, and pixels included in an image display area has a luminance of about 110. Therefore, the line representative values of lines included in the image display area have values around 110.

Figure 4:
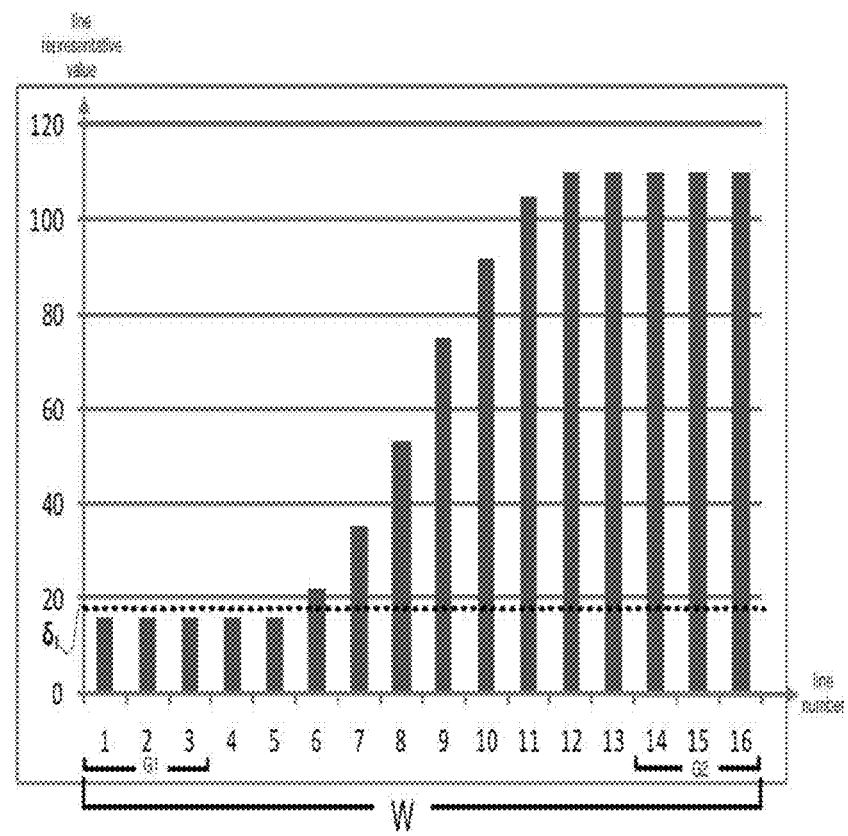
FIG. 4 is a diagram illustrating a mechanism for detecting a first area using line representative values, a window, a first line group, and a second line group.

FIG. 4 is a graph of line representative values of lines. Referring to FIG. 4, a window W including a plurality of lines is set, and a first line group G1 and a second line group G2 each including a plurality of lines are set in the window W. As an example, the window W may include 16 lines, and each of the first and second line groups G1 and G2 may include three lines.

By performing arithmetic processing on the line representative values of the plurality of lines included in the first and second line groups G1 and G2 set as described above, a first-line-group-representative-value and a second-line-group-representative-value are calculated. In other words, by calculating any one value among the minimum value, the maximum value, the mode value, the median value, the summation, the weighted sum, the arithmetic mean, the weighted average, and the geometric average of line representative values of lines 1, 2, and 3 included in the first line group G1, a first-line-group-representative-value is obtained. In exemplary embodiments below, the arithmetic mean of the line representative values of lines included in a line group is used as the corresponding line group representative value. Since the line representative values of the lines 1, 2, and 3 included in the first line group G1 are 16, 16, and 16 respectively, the arithmetic mean is 16, and the first-line-group-representative-value is 16. Also, since the line representative values of the lines 14, 15, and 16 included in the second line group G2 are 110, 110, and 110 respectively, the second-line-group-representative-value is 110.

Although the arithmetic mean of color information of pixels included in any one line has been used as the line representative value in the above description, arithmetic processing other than calculation of an arithmetic mean, such as calculation of any one of a minimum value, a maximum value, a mode value, a median value, a summation, a weighted sum, a weighted average, and a geometric average, may be performed on line representative values of lines included in a line group, and a result of the arithmetic processing may be used as the line group representative value.

The first-line-group-representative-value and the second-line-group-representative-value are compared to select a smaller value, and a first-area-threshold-value $\delta_1$ is calculated by multiplying the selected value and a predetermined proportional constant. A first area includes a transition area and an image display area, and pixels included in the first area generally have larger luminance values than pixels included in a non-image display area that is displayed in black.

In the process of calculating a threshold value for detecting the first area, the first-line-group-representative-value of 16, that is, the smaller value between the first-line-group-representative-value of 16 and the second-line-group-representative-value of 110, is selected. By multiplying the selected line group representative value and the predetermined proportional constant, the first-area-threshold-value $\delta_1$ is calculated. When the proportional constant is smaller than 1, the calculated first-area-threshold-value $\delta_1$ becomes smaller than 16, and the non-image display area may be included in the first area. Therefore, the proportional constant is at least 1. Also, the proportional constant is determined so that the first-area-threshold-value may have a high enough value to distinguish between the non-image display area and the first area. Therefore, it is possible to see in FIG. 4 that the first-area-threshold-value $\delta_1$ is calculated to be slightly higher than the first-line-group-representative-value of 16.

The first-area-threshold-value $\delta_1$ and the line representative values of the lines included in the window W are compared to detect the first area. According to an exemplary embodiment, after the line representative values of the lines included in the window W and the first-area-threshold-value $\delta_1$ are compared, a line whose line representative value is equal to or larger than the first-area-threshold-value $\delta_1$ may be determined to be included in the first area, and a line whose line representative value is smaller than the first-area-threshold-value $\delta_1$ is determined not to be included in the first area. In other words, in FIG. 4, the lines 1 to 5 whose line representative values are smaller than the first-area-threshold-value $\delta_1$ are not included in the first area, and the line 6 and subsequent lines whose line representative values are larger than the first-area-threshold-value $\delta_1$ are included in the first area. In this way, it is possible to detect the non-image display area and the first area.

Subsequently, by giving a binary code "1" to the lines included in the detected first area and a binary code "0" to the lines not included in the first area, it is possible to indicate whether or not the lines are included in the first area. In other words, the lines 1 to 16 shown in FIG. 4 are indicated as "0000 0111 1111 1111." Therefore, it is possible to know that the line 6 and the subsequent lines are included in the first area, and the lines 1 to 5 belong to the non-image display area.

According to an exemplary embodiment, when all the line representative values of lines included in a window are 16, the representative values of a first line group and a second line group are 16. Here, 16, which is a value equal to or smaller than the other values, is selected and multiplied by a proportional constant larger than 1 to calculate a first-area-threshold-value, and a value larger than 16 is obtained. Therefore, when the line representative values of all the lines included in the window and the first-area-threshold-value are compared, no line is included in a first area, and it is not possible to detect the first area. In this case, the window is shifted by a predetermined number of lines, and then the same process is performed until a first area is detected.

First-order differentiations of the line representative values are calculated to detect a second area (S200a). In this exemplary embodiment, the second area denotes area transition area that is detected using the first-order differentiations of the line representative values. According to an exemplary embodiment of calculating first-order differentiations of line representative values shown in FIG. 4, the line representative value of the line 5 is 16, the line representative value of the line 6 is 22, and the line representative value of the line 7 is 35. In this case, line-representative-value-first-order-differentiations may be obtained by calculating a difference in the line representative values between lines, and the line-representative-value-first-order-differentiations of the lines 6, 7, and 8 are 6 and 13.

Figure 5:
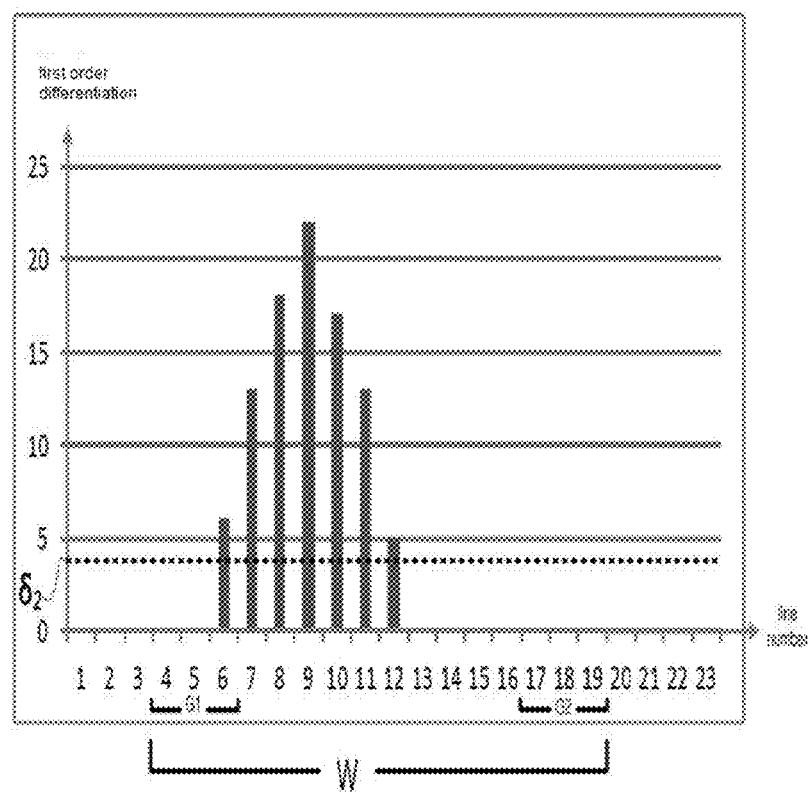
FIGS. 5 and 6 are diagrams illustrating a mechanism for detecting a second area using first-order differentiations of line representative value, a window, a first line group, and a second line group.

When first-order differentiations of the line representative values shown in FIG. 4 are calculated in this way, a graph of first-order differentiation versus line number has one peak as shown in FIG. 5. In other words, it is possible to know that a line-representative-value-first-order-differentiation begins to increase at the line 6, has the maximum at the line 9 that is an intermediate area of a transition area, decreases to a value other than 0 until the line 12, and is 0 at the line 13 and subsequent lines belonging to the image display area.

As described above, a transition area is caused by a process in which a scaler performs interpolation using n non-image display area and an image display area. As an example, assuming that a non-image display area in which no image is displayed is black and an image display area in which an image is displayed is white, a grey transition area is formed as a result of the interpolation between the non-image display area and the image display area. A line of the transition area facing the non-image display area has a line representative value approximating a line representative value of the non-image display area, and a line of the transition area facing the image display area has a line representative value approximating a line representative value of the image display area.

Referring to FIG. 5 showing first-order differentiations of line representative values, a window W including a plurality of lines is set, and a first line group G1 and a second line group G2 each including a plurality of lines are set in the window W.

As an example, as shown in the drawing, the window W may include 16 lines, and each of the first and second line groups G1 and G2 may include three lines. In this operation according to an exemplary embodiment, the window W and the first and second line groups G1 and G2 may be set to have the same number of lines as the window W and the first and second line groups G1 and G2 in the preceding operation, respectively. In this operation according to another exemplary embodiment, the window W and the first and second line groups G1 and G2 may be set to have a different number of lines from the window W and the first and second line groups G1 and G2 in the preceding operation, respectively. For brief and clear description below, the number of lines included in the window W and the number of lines included in each of the first and second line groups G1 and G2 are set to 16 and 3, respectively, which are the same as those in the preceding operation.

By performing arithmetic processing on the line-representative-value-first-order-differentiations of the plurality of lines included in the first and second line groups G1 and G2 set as mentioned above, a first-order-differentiation-representative-value of the first line group G1 and a first-order-differentiation-representative-value of the second line group G2 are calculated. In other words, any one value among the minimum value, the maximum value, the mode value, the median value, the summation, the weighted sum, the arithmetic mean, the weighted average, and the geometric average of the line-representative-value-first-order-differentiations of lines 4, 5 and 6 included in the first line group G1 is calculated as the first-order-differentiation-representative-value of the first line group G1. In exemplary embodiments below, the arithmetic mean of the line-representative-value-first-order-differentiations of lines included in a line group is used as the first-order-differentiation-representative-value of the corresponding line group.

In FIG. 5, the first-order differentiations of the lines 4, 5, and 6 included in the first line group G1 are 0, 0, and 6, respectively. Since the arithmetic mean of first-order differentiations is 2, the first-order-differentiation-representative-value of the first line group G1 is 2. Also, the first-order differentiations of lines 16, 17, and 18 included in the second line group G2 are 0, 0, and 0, respectively, and the first-order-differentiation-representative-value of the second line group G2 is 0.

Although the arithmetic mean is used as line representative values in the above-described exemplary embodiments, arithmetic processing other than calculation of the arithmetic mean, such as calculation of a minimum value, a maximum value, a mode value, a median value, a summation, a weighted sum, a weighted average, and a geometric average, may be performed on first-order differentiations of a line group, and a result of the arithmetic processing may be used as the first-order-differentiation-representative-value of the line group.

The first-order-differentiation-representative-value of the first line group G1 and the first-order-differentiation-representative-value of the second line group G2 are compared to select a larger value, and a second-area-threshold-value $\delta_2$ is calculated by multiplying the selected value and a predetermined proportional constant. Therefore, between 2 that is the first-order-differentiation-representative-value of the first line group G1 and 0 that is the first-order-differentiation-representative-value of the second line group G2, 2 that is a value equal to or larger than the other value is selected. By multiplying the selected line group representative value and a predetermined proportional constant, the second-area-threshold-value $\delta_2$ is calculated. When the proportional constant is a very small value, the calculated second-area-threshold-value $\delta_2$ becomes much smaller than 2, and whether or not an area is included in the second area is affected by a very small change in a line-representative-value-first-order-differentiation. Therefore, a very small proportional constant is not appropriate, and the proportional constant is at least 1. Also, the proportional constant is not so large so that an area required to be included in the second area is included in the second area. It is possible to see in FIG. 5 that the second-area-threshold-value $\delta_2$ is calculated to be slightly higher than the first-line-group-representative-value of 2.

The second-area-threshold-value $\delta_2$ and the line-representative-value-first-order-differentiations of the lines included in the window W are compared to detect the second area. According to an exemplary embodiment, by comparing the line-representative-value-first-order-differentiations of the lines included in the window W and the second-area-threshold-value $\delta_2$, lines whose line-representative-value-first-order-differentiations are equal to or larger than the second-area-threshold-value $\delta_2$ are detected first. In other words, in FIG. 5, the lines 6 to 12 whose line-representative-value-first-order-differentiations are larger than the second-area-threshold-value $\delta_2$ are detected first.

There is no doubt as to which area the detected lines 1 to 5 and the detected lines 6 to 11 are included in, but it may be problematic as to whether or not the line 12 is included in the second area. Referring to FIG. 5, the line-representative-value-first-order-differentiations of the lines 6 to 12 are not shown to be 0, and thus it is possible to determine that there are changes in the line representative values of the lines 6 to 12. However, referring to FIG. 4, there is no change in the line representative value between the line 1 and the line 5, the line representative value increases between the line 6 and the line 11, and there is no change in the line representative value at the line 12 and subsequent lines.

These results are caused by calculating one line-representative-value-first-order-differentiation from the line representative values of two lines adjacent to each other. Since the line representative values of the lines 11 and 12 are 105 and 110 in FIG. 4, respectively, the line-representative-value-first-order-differentiation of the line 12 is 5. Also, both the line representative values of the lines 12 and 13 are 110. It is possible to know that the line-representative-value-first-order-differentiation finally becomes 0 at the line 13, and the line-representative-value-first-order-differentiation of the line 12 is not 0. Therefore, a line immediately before where the line-representative-value-first-order-differentiation becomes 0 or a value close to 0 among the calculated line-representativevalue-first-order-differentiations, is excluded from the second area. In other words, in FIG. 5, the line-representative-value-first-order-differentiations of the lines 6 to 12 exceed the second-area-threshold-value $\delta_2$, but the line 12 is not included in the second area because the line 12 is immediately before the line-representative-value-first-order-differentiation of 0.

Subsequently, by giving a binary code "1" to the lines included in the detected second area and a binary code "0" to the lines not included in the second area, it is possible to indicate whether or not the lines are included in the second area. In other words, the lines 1 to 16 are indicated as "0000 0111 1110 0000," so that the lines 6 to 11 may be indicated to be included in the second area.

Figure 6:
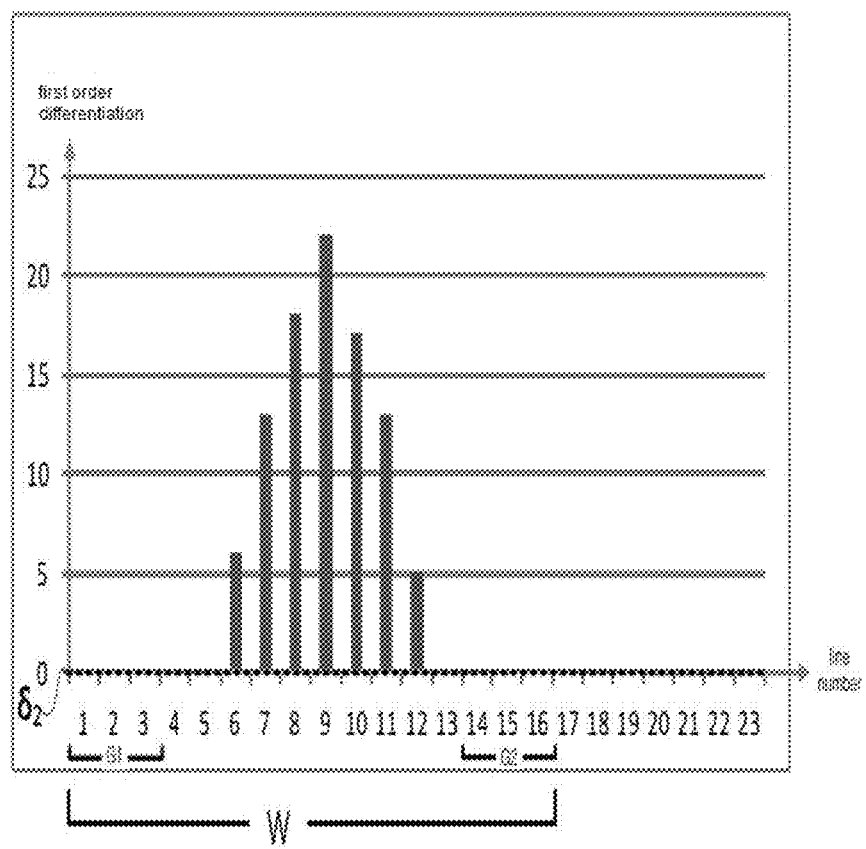

According to an exemplary embodiment, when all the line-representative-value-first-order-differentiations of lines included in a first line group G1 and a second line group G2 are 0 as shown in FIG. 6, the first-order-differentiation-representative-values of the first line group G1 and the second line group G2 may also be 0. Even when 0 which is a value equal to or smaller than the other values is selected and multiplied by a proportional constant larger than 1 to calculate a second-area-threshold-value, a value of 0 is obtained. Therefore, when the line-representative-value-first-order-differentiations of all the lines included in the window and a second-area-threshold-value are compared, all the lines are included in a second area, and it is not possible to detect the second area. In this case, the window is shifted by a predetermined number of lines, and then the same process is performed until the second area is detected.

Second-order differentiations of the line representative values are calculated to detect a third area (S200b). In this exemplary embodiment, the third area denotes an area that is detected using the second-order differentiations of the line representative values to detect a transition area. A second-order differentiation graph of line representative values has an upward convex peak and a downward convex peak as shown in FIG. 7.

According to an exemplary embodiment, line-representative-value-second-order-differentiations may be calculated in various ways. In the above-described example of FIG. 5, the line-representative-value-first-order-differentiation of the line 5 is 0, that of the line 6 is 6, and that of the line 7 is 13. Therefore, the line-representative-value-second-order-differentiation of the line 6 is 6 obtained by subtracting the line-representative-value-first-order-differentiation of the line 5 from the line-representative-value-first-order-differentiation of the line 6, and the line-representative-value-second-order-differentiation of the line 7 is 7 obtained by subtracting the line-representative-value-first-order-differentiation of the line 6 from the line-representative-value-first-order-differentiation of the line 7. In other words, it is possible to find a second-order differentiation by calculating a difference in first-order differentiation between lines adjacent to each other.

Figure 7:
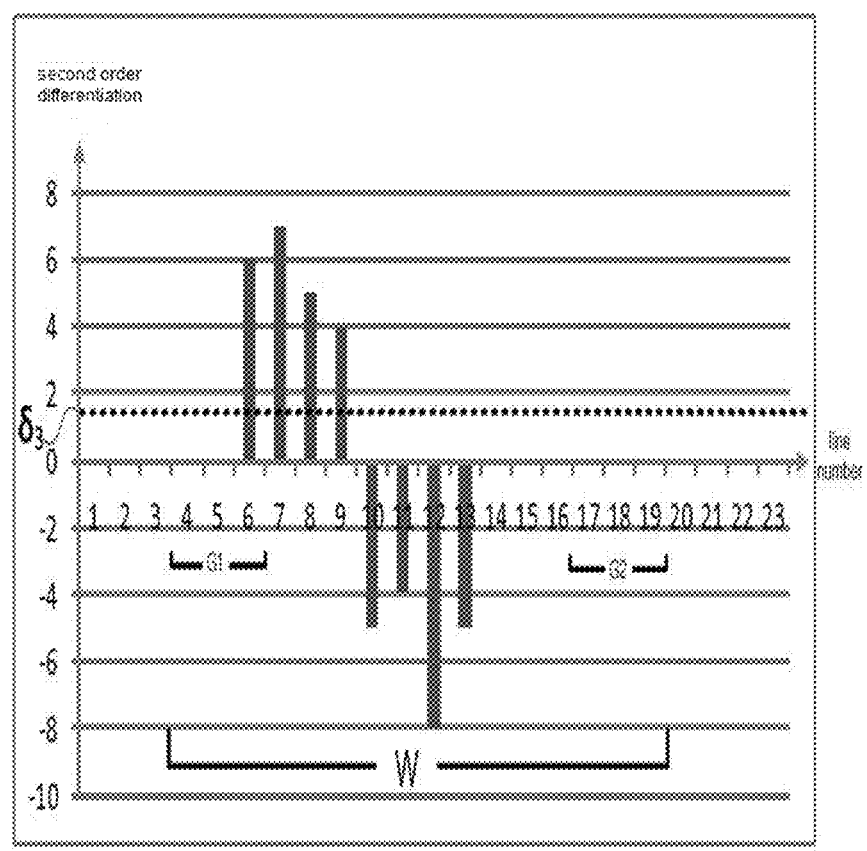
FIGS. 7 and 8 are diagrams illustrating a mechanism for detecting a third area using second-order differentiations of line representative value, a window, a first line group, and a second line group.

Referring to FIG. 7, a window W including a plurality of lines is set, and a first line group G1 and a second line group G2 each including a plurality of lines are set in the window W. As an example, the window W may include 16 lines, and each of the first and second line groups G1 and G2 may include three lines. In this operation according to an exemplary embodiment, the window W and the first and second line groups G1 and G2 may be set to have the same number of lines as the window W and the first and second line groups G1 and G2 in the preceding operation, respectively. In this operation according to another exemplary embodiment, the window W and the first and second line groups G1 and G2 may be set to have a different number of lines from the window W and the first and second line groups G1 and G2 in the preceding operation, respectively. For brief and clear description below, the number of lines included in the window W and the number of lines included in each of the first and second line groups G1 and G2 are set to 16 and 3, respectively, which are the same as those in the preceding operation.

By performing arithmetic processing on the line-representative-value-second-order-differentiations of the plurality of lines included in the first and second line groups G1 and G2 set as mentioned above, a second-order-differentiation-representative-value of the first line group G1 and a second-order-differentiation-representative-value of the second line group G2 are calculated. In other words, any one value among the minimum value, the maximum value, the mode value, the median value, the summation, the weighted sum, the arithmetic mean, the weighted average, and the geometric average of the line-representative-value-second-order-differentiations of lines 4, 5, and 6 included in the first line group G1 is calculated as the second-order-differentiation-representative-value of the first line group G1. In exemplary embodiments below, the arithmetic mean of the line-representative-value-second-order-differentiations of lines included in a line group is used as the second-order-differentiation-representative-value of the corresponding line group.

The second-order differentiations of the lines 4, 5, and 6 included in the first line group G1 are 0, 0, and 6, respectively. Since the arithmetic mean of second-order differentiations is 2, the second-order-differentiation-representative-value of the first line group G1 is 2. Also, the second-order differentiations of lines 16, 17, and 18 included in the second line group G2 are 0, 0, and 0, respectively, and the second-order-differentiation-representative-value of the second line group G2 is 0.

Although the arithmetic mean is used as line representative values in the above-described exemplary embodiments, arithmetic processing other than calculation of an arithmetic mean, such as calculation of a minimum value, a maximum value, a mode value, a median value, a summation, a weighted sum, a weighted average, and a geometric average, may be performed on second-order differentiations of a line group, and a result of the arithmetic processing may be used as the second-order-differentiation-representative-value of the line group.

The absolute value of the second-order-differentiation-representative-value of the first line group G1 and the absolute value of the second-order-differentiation-representative-value of the second line group G2 are compared to select a larger value, and a third-area-threshold-value $\delta_3$ is calculated by multiplying the selected value and a predetermined proportional constant. As shown in FIG. 7, a line-representative-value-second-order-differentiation may have a negative number, and thus a third-area-threshold-value is calculated using the absolute values of second-order-differentiation-representative-values of line groups. Therefore, between 2 that is the second-order-differentiation-representative-value of the first line group G1 and 0 that is the second-order-differentiation-representative-value of the second line group G2, 2 which is a value equal to or larger than the other value is selected.

By multiplying the selected second-order representative value of the first line group G1 and a predetermined proportional constant, the third-area-threshold-value $\delta_3$ is calculated. When the proportional constant is a small value less than 1, the calculated third-area-threshold-value $\delta_3$ becomes much smaller than 2, and whether or not an area is included in the third area is affected by a very small change in a line-representative-value-second-order-differentiation. Therefore, a very small proportional constant is not appropriate, and the proportional constant is at least 1. Also, the proportional constant is so large so that an area required to be included in the third area is not included in the third area. It is possible to see in FIG. 7 that the third-area-threshold-value $\delta_3$ is calculated to be slightly higher than the first-line-group-representative-value of 2.

The third-area-threshold-value $\delta_3$ and the line-representative-value-second-order-differentiations of the lines included in the window W are compared to detect the third area. According to an exemplary embodiment, the absolute values of line-representative-value-second-order-differentiations of the lines included in the window W and the third-area-threshold-value $\delta_3$ are compared. Then, lines 6 to 13 whose absolute values of line-representative-value-second-order-differentiations are larger than the third-area-threshold-value $\delta_3$ are detected first.

Similarly to the above-described case of detecting the second area using the first-order differentiations of line representative values, in the case of detecting the third area using the second-order differentiations of line representative values, one line-representative-value-second-order-differentiation is calculated from the line-representative-value-first-order-differentiations of two lines adjacent to each other. Therefore, two lines immediately before the line-representative-value-second-order-differentiation becomes 0 or a value close to 0 among the calculated line-representative-value-second-order-differentiations are excluded from the third area. In other words, in FIG. 7, the line-representative-value-second-order-differentiations of the lines 6 to 13 exceed the third-area-threshold-value $\delta_3$, but the lines 12 and 13 are not included in the third area because the two lines are immediately before the line-representative-value-second-order-differentiation of 0.

Subsequently, by giving a binary code "1" to the lines included in the detected third area and a binary code "0" to the lines not included in the third area, it is possible to indicate whether or not the lines are included the third area. In other words, the lines 1 to 16 shown in FIG. 8 are indicated as "0000 0111 1110 0000," so that the lines 6 to 11 may be indicated to be included in the third area.

Figure 8:
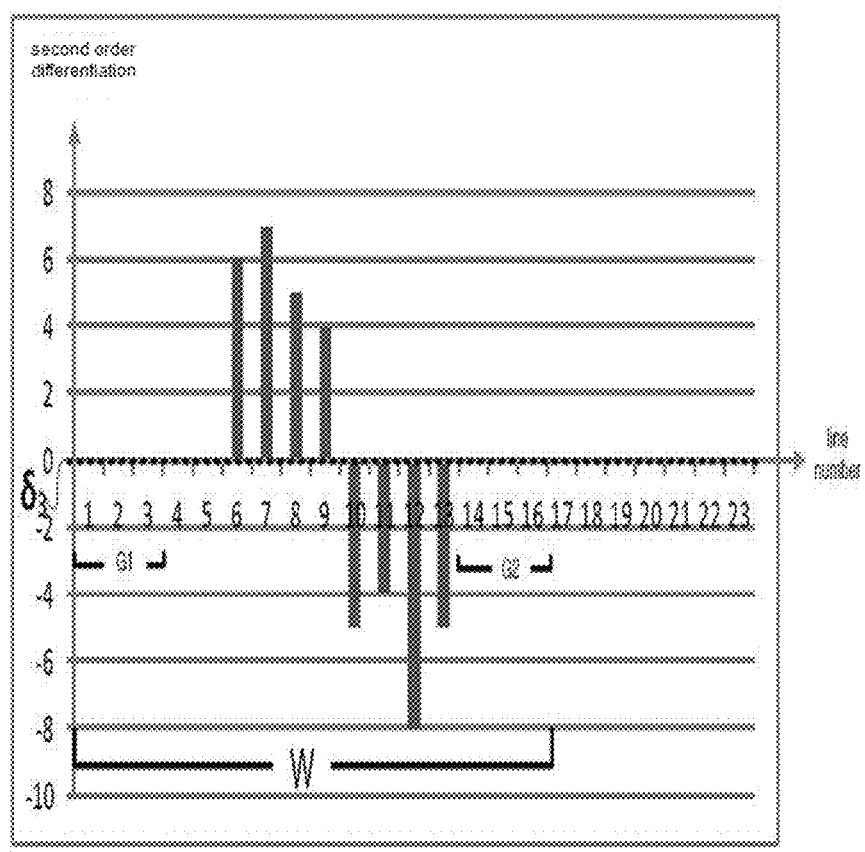

According to an exemplary embodiment, when all the line-representative-value-second-order-differentiations of lines included in a first line group G1 and a second line group G2 are 0 as shown in FIG. 8, the second-order-differentiation-representative-values of the first line group G1 and the second line group G2 may also be 0. Even when 0 which is a value equal to or larger than the other value is selected and multiplied by a proportional constant larger than 1 to calculate a third-area-threshold-value, a value of 0 is obtained. Therefore, when the line-representative-value-second-order-differentiations of all the lines included in the window and the third-area-threshold-value are compared, all the lines are included in a third area, and it is not possible to detect a boundary of the third area. In this case, the window is shifted by a predetermined number of lines, and then the same process is performed until the boundary of the third area is detected.

Referring back to FIG. 1, the first area and at least one of the second area and the third area are aligned, and a logical operation is performed to detect a transition area (S300a and S300b). According to an exemplary embodiment, a first area includes a transition area and an image display area, a second area includes an area in which the first-order differentiations of line representative values are equal to or larger than a predetermined threshold value, and a third area includes an area in which the second-order differentiations of line representative values are equal to or larger than a predetermined threshold value.

According to the above-described exemplary embodiment, the first area is indicated as "0000 0111 1111 1111 . . . " in binary code, and the second area is indicated as "0000 0111 1110 0000 . . . ." Since the first and second areas begin at the same line, that is, the line 6, it is possible to know that the two areas are aligned with each other. Using the first area and the third area, it is also possible to detect the transition area. Even according to such an exemplary embodiment, the first area is indicated as "0000 0111 1111 1111 . . . ," and the third area is indicated as "0000 0111 1110 0000 . . . . " It is possible to know that the first and third areas are aligned with each other. Also according to an exemplary embodiment of detecting the transition area using the first area, the second area, and the third area, the first to third areas all begin at the line 6 and thus are aligned with each other.

However, any one area may begin at a different line than another area due to occurrence of jitter, or so on. In this case, the one area and the other area are not aligned with each other, and thus no transition area is detected. Subsequently, a logical conjunction (AND) operation is performed on the aligned areas to detect the transition area. In binary code, the first area may be indicated as "0000 0111 1111 1111 . . . ," and the second area may be indicated as "0000 0111 1110 0000 . . . . " When a logical conjunction (AND) operation is performed on the binary codes representing the areas, a result "0000 0111 1110 0000 . . . " is obtained, and it is possible to know that the lines 6 to 11 correspond to the transition area. As with the above-described exemplary embodiments, it is also possible to detect the transition area by performing a logical conjunction operation on the binary code representing the first area and a binary code representing the third area, and by performing a logical conjunction operation on the binary codes representing the first, second, and third areas.

In this exemplary embodiment, an example of indicating a line included in an area with the binary bit "1," and an example of performing a logical conjunction operation have been described, but the examples are for clear description only. Needless to say, it is also possible to indicate a line included in an area with the binary bit "0," and detect a transition area by performing another logical operation.

According to an exemplary embodiment, when threshold values for detecting the first to third areas are changed in the process of detecting the areas, a boundary of a detected transition area may be slightly changed. Therefore, to prevent a change in the boundary of the transition area, filtering is performed by an average filter that calculates average of detected transition area boundaries of several frames, a median filter that calculates medians of detected transition area boundaries of several frames, or so on.

According to an exemplary embodiment, after the transition area is detected, image processing is separately performed on the non-image display area, the image display area, and the transition area. Therefore, unlike related art, it is possible to prevent a grey transition area, which is formed by the interpolation between the non-image display area in dark color and a white image displayed in the image display area, from infiltrating into the non-image display area or the image display area and degrading image quality.

According to exemplary embodiments of the present invention, an image display area, a non-image display area, and a transition area are detected and separately subjected to image processing. Therefore, an image displayed in any one area does not infiltrate into another area and does not deteriorate image quality, so that the quality of the displayed image may be improved.

Figure 9:
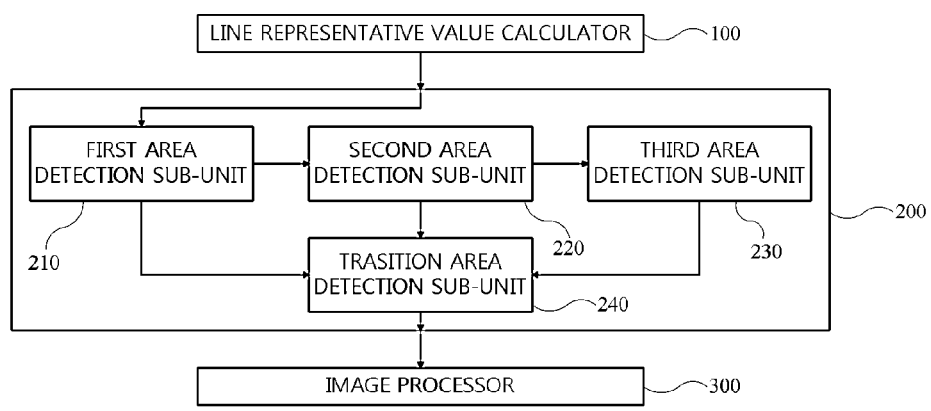
FIG. 9 is a block diagram of an apparatus for processing an image according to an exemplary embodiment.

An apparatus for processing an image according to an exemplary embodiment of the present invention will be described below with reference to FIG. 9. FIG. 9 is a block diagram of an apparatus for processing an image according to an exemplary embodiment. For brief and clear description, details described above may not be reiterated. The apparatus for processing an image according to this exemplary embodiment of the present invention may include: a line representative value calculator 100 that calculates line representative values of an image including an image display area, an non-image display area, and a transition area interposed between the image display area and the non-image display area; a transition area detector 200 including a first area detection sub-unit 210 that detects a first area using the calculated line representative values, a second area detection sub-unit 220 that detects a second area using first-order differentiations of the calculated line representative values, and a transition area detection sub-unit 240 that detects the transition area by aligning the first area and the second area; and an image processor 300 that separately performs image processing on the non-image display area, the transition area, and the image display area of the image. In an exemplary embodiment, the apparatus for processing an image may further include a filter that performs filtering on a boundary of the detected transition area to prevent a change in the boundary of the detected transition area. In an exemplary embodiment, the transition area detector may include a third area detection subunit 230 that detects a third area using second order differentiations of the calculated line representative values instead of or in addition to the second detection subunit 220. In this case the transition area detection sub-unit 240 may detect the transition area by aligning the first and the third areas or the first, the second and the third areas.

The line representative value calculator 100 calculates line representative values using the color information values of pixels included in a line extending in one direction. As an example, when the non-image display area is in the form of a letterbox (see FIG. 3A), the color information values of pixels included in first-direction lines of the image are obtained. As another example, when the non-image display area is in the form of a pillar box (see FIG. 3B), the color information values of pixels included in second-direction lines of the image are obtained. As still another example, when both the non-image display area in the form of a letterbox and the non-image display area in the form of a pillar box are in the image, the line representative values of any lines between the first-direction lines and the second-direction lines may be calculated first, and then the line representative values of the other-direction lines may be calculated. As yet another example, when both the non-image display area in the form of a letterbox and the non-image display area in the form of a pillar box are in the image, the line representative values of the first-direction lines and the second-direction lines may be calculated at the same time.

The transition area detector 200 includes the first area detection sub-unit 210 that detects the first area using the calculated line representative values; at least one of the second area detection sub-unit 220 that detects the second area using the first-order differentiations of the calculated line representative values and a third area detection sub-unit 230 that detects a third area using the second-order differentiations of the calculated line representative values; and a transition area detection sub-unit 240 that detects the transition area by aligning the first area and at least one of the detected second and third areas.

The first area detection sub-unit 210 included in the transition area detector 200 sets a first line group and a second line group each including a plurality of lines in a window including a plurality of lines, calculates a first-line-group-representative-value and a second-line-group-representative-value through arithmetic processing of the line representative values of the plurality of lines included in the set line groups, calculates a first-area-threshold-value using the first-line-group-representative-value and the second-line-group-representative-value, and detects the first area by comparing the first-area-threshold-value with the line representative values of the lines included in the window.

The second area detection sub-unit 220 included in the transition area detector 200 calculates the line-representative-value-first-order-differentiations using the line representative values, sets a first line group and a second line group each including a plurality of lines in a window including a plurality of lines, calculates a first-order-differentiation-representative-value of the first line group and a first-order-differentiation-representative-value of the second line group through arithmetic processing of the line representative values of the plurality of lines included in the set line groups, calculates a second-area-threshold-value using the first-order-differentiation-representative-value of the first line group and the first-order-differentiation-representative-value of the second line group, and detects the second area by comparing the second-area-threshold-value with the line-representative-value-first-order-differentiations of the lines included in the window.

The third area detection sub-unit 230 included in the transition area detector 200 calculates the line-representative-value-second-order-differentiations, sets a first line group and a second line group each including a plurality of lines in a window including a plurality of lines, calculates a second-order-differentiation-representative-value of the first line group and a second-order-differentiation-representative-value of the second line group through arithmetic processing of the line representative values of the plurality of lines included in the set line groups, calculates a third-area-threshold-value using the second-order-differentiation-representative-value of the first line group and the second-order-differentiation-representative-value of the second line group, and detects the third area by comparing the third-area-threshold-value with the line-representative-value-second-order-differentiations of the lines included in the window. However, as described above, one line-representative-value-first-order-differentiation is calculated from the line representative values of two lines adjacent to each other, and one line-representative-value-second-order-differentiation is calculated from the line-representative-value-first-order-differentiations of two lines adjacent to each other. Therefore, the second area detection sub-unit 220 detects the second area by excluding a line immediately before where the line-representative-value-first-order-differentiation becomes 0 or a value close to 0 from the second area, and the third area detection sub-unit 230 detects the third area by excluding two lines immediately before where the line-representative-value-second-order-differentiation becomes 0 or a value close to 0 from the third area.

The transition area detection sub-unit 240 included in the transition area detector 200 aligns at least one of the detected second and third areas with the start point of the first area, and performs a logical conjunction operation, thereby detecting the transition area.

The image processor 300 separately performs image processing, such as motion estimation (ME) and motion compensation (MC), on the image display area, the non-image display area, and the transition area, thereby preventing an image displayed in the transition area from infiltrating into the image display area or the non-image display area.

According to exemplary embodiments of the present invention, when the aspect ratios of an image and a display device are not identical to each other or a low-resolution image is upconverted by a scaler, a transition area, which is blurred because both an area in which the image is displayed and an area in which no image is displayed are mixed together, can be detected as an independent area, and image processing can be separately performed on the area in which the image is displayed, the area in which no image is displayed, and the transition area. Therefore, it is possible to improve the quality of the image displayed on the display device.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of detecting a transition area, the method comprising:
    calculating line representative values of an image to detect a first area;
    calculating first-order differentiations of the line representative values to detect a second area; and
    aligning the first area and the second area and performing a logical operation to detect a transition area.

2. The method of claim 1, further comprising, after detecting of the second area, calculating second-order differentiations of the line representative values to detect a third area,
    wherein the aligning of the first area and the second area to detect the transition area includes aligning the third area together with the first area and the second area and performing the logical operation to detect the transition area.

3. The method of claim 2, wherein the aligning of the third area together with the first area and the second area includes determining whether or not a beginning line of the first area, a beginning line of the second area, and a beginning line of the third area are identical to one another.

4. The method of claim 1, wherein the calculating of the line representative values of the image includes:
    obtaining at least one element of gray-scale luminance, hue-saturation-luminance (HSL), YCbCr (luminance and chrominance information), and YUV (luminance, blue-luminance difference, and red-luminance difference) color information of pixels included in lines of the image; and
    performing arithmetic processing on the obtained at least one element of the pixels.

5. The method of claim 4, wherein the performing of the arithmetic processing on the obtained at least one element of the color information of the pixels includes calculating any one of a minimum value, a maximum value, a mode value, a median value, a summation, a weighted sum, an arithmetic mean, a weighted average, and a geometric average of the obtained at least one element of the color information of the pixels.

6. The method of claim 1, wherein the detecting of the first area includes:
    setting a first line group and a second line group each including a plurality of lines in a window including a plurality of lines, and performing arithmetic processing on line representative values of the plurality of lines included in the set line groups to calculate a first-line-group-representative-value and a second-line-group-representative-value;
    calculating a first-area-threshold-value using the first-line-group-representative-value and the second-line-group-representative-value; and
    comparing the first-area-threshold-value with line representative values of the lines included in the window to detect the first area.

7. The method of claim 6, wherein the performing of the arithmetic processing on the line representative values of the plurality of lines includes calculating any one of a minimum value, a maximum value, a mode value, a median value, a summation, a weighted sum, an arithmetic mean, a weighted average, and a geometric average of the line representative values of the plurality of lines.

8. The method of claim 6, wherein the calculating of the first-area-threshold-value includes:
    comparing the first-line-group-representative-value with the second-line-group-representative-value to select one value equal to or smaller than the other value; and
    multiplying the selected value by a proportional constant equal to or larger than 1 to calculate the first-area-threshold-value.

9. The method of claim 1, wherein the calculating of the first-order differentiations of the line representative values includes calculating differences in line representative value between adjacent lines.

10. The method of claim 1, wherein the detecting of the second area includes:
    setting a first line group and a second line group each including a plurality of lines in a window including a plurality of lines, and performing arithmetic processing on the first-order differentiations of the plurality of lines included in the set line groups to calculate a first-order-differentiation-representative-value of each of the first line group and the second line group;
    calculating a second-area-threshold-value using the first-order-differentiation-representative-value of the first line group and the first-order-differentiation-representative-value of the second line group; and
    comparing the second-area-threshold-value with the first-order differentiations of the lines included in the window to detect the second area.

11. The method of claim 10, wherein the performing of the arithmetic processing on the first-order differentiations of the plurality of lines includes calculating any one of a minimum value, a maximum value, a mode value, a median value, a summation, a weighted sum, an arithmetic mean, a weighted average, and a geometric average of the first-order differentiations of the plurality of lines.

12. The method of claim 10, wherein the calculating of the second-area-threshold-value includes:
    comparing the first-order-differentiation-representative-value of the first line group with the first-order-differentiation-representative-value of the second line group to select one value equal to or larger than the other value; and
    multiplying the selected value by a proportional constant equal to or larger than 1 to calculate the second-area-threshold-value.

13. The method of claim 1, wherein the aligning of the first area and the second area includes determining whether or not a beginning line of the detected first area and a beginning line of the second area are identical to each other.

14. The method of claim 1, wherein the detecting of the first area includes representing the detected first area with a binary code,
the detecting of the second area includes representing the detected second area with a binary code, and
the detecting of the transition area includes performing a logical operation on the binary code representing the first area and the binary code representing the second area.

15. The method of claim 14, wherein the representing of the detected first area with the binary code includes representing the detected first area with a binary code "1" and representing a remaining area other than the first area with a binary code "0,"
the representing the detected second area with the binary code includes representing the detected second area with the binary code "1" and representing a remaining area other than the second area with the binary code "0," and
the performing of the logical operation on the binary code representing the first area and the binary code representing the second area includes performing a logical conjunction (AND) operation on the binary code representing the first area and the binary code representing the second area.

16. The method of claim 1, further comprising, after the detecting of the transition area, performing filtering on a boundary of the detected transition area.

17. A method of detecting a transition area, the method comprising:
calculating line representative values of an image to detect a first area;
calculating second-order differentiations of the line representative values to detect a third area; and
aligning the first area and the third area and detecting a transition area.

18. The method of claim 17, wherein the calculating of the line representative values of the image includes:
obtaining at least one element of gray-scale luminance, hue-saturation-luminance (HSL), YCbCr (luminance and chrominance information), and YUV (luminance, blue-luminance difference, and red-luminance difference) color information of pixels included in lines of the image; and
performing arithmetic processing on the obtained at least one element of the pixels.

19. The method of claim 18, wherein the performing of the arithmetic processing on the obtained at least one element of the color information of the pixels includes calculating any one of a minimum value, a maximum value, a mode value, a median value, a summation, a weighted sum, an arithmetic mean, a weighted average, and a geometric average of the obtained at least one element of the color information of the pixels.

20. The method of claim 17, wherein the detecting of the first area includes:
setting a first line group and a second line group each including a plurality of lines in a window including a plurality of lines, and performing arithmetic processing on line representative values of the plurality of lines included in the set line groups to calculate a first-line-group-representative-value and a second-line-group-representative-value;
calculating a first-area-threshold-value using the first-line-group-representative-value and the second-line-group-representative-value; and
comparing the first-area-threshold-value with line representative values of the lines included in the window to detect the first area.

21. The method of claim 20, wherein the performing of the arithmetic processing on the line representative values of the plurality of lines includes calculating any one of a minimum value, a maximum value, a mode value, a median value, a summation, a weighted sum, an arithmetic mean, a weighted average, and a geometric average of the line representative values of the plurality of lines.

22. The method of claim 20, wherein the calculating of the first-area-threshold-value includes:
comparing the first-line-group-representative-value with the second-line-group-representative-value to select one value equal to or smaller than the other value; and
multiplying the selected value by a proportional constant equal to or larger than 1 to calculate the first-area-threshold-value.

23. The method of claim 17, wherein the calculating of the second-order differentiations of the line representative values includes:
calculating line-representative-value-first-order-differentiations that are differences in line representative values between adjacent lines; and
calculating differences in the line-representative-value-first-order-differentiations between adjacent lines.

24. The method of claim 17, wherein the detecting of the third area includes:
setting a first line group and a second line group each including a plurality of lines in a window including a plurality of lines, and performing arithmetic processing on the second-order differentiations of the plurality of lines included in the set line groups to calculate a second-order-differentiation-representative-value of each of the first line group and the second line group;
calculating a third-area-threshold-value using the second-order-differentiation-representative-value of the first line group and the second-order-differentiation-representative-value of the second line group; and
comparing the third-area-threshold-value with the second-order differentiations of the lines included in the window to detect the third area.

25. The method of claim 24, wherein the performing of the arithmetic processing on the second-order differentiations of the plurality of lines includes calculating any one of a minimum value, a maximum value, a mode value, a median value, a summation, a weighted sum, an arithmetic mean, a weighted average, and a geometric average of the second-order differentiations of the plurality of lines.

26. The method of claim 24, wherein the calculating of the third-area-threshold-value includes:
comparing the second-order-differentiation-representative-value of the first line group with the second-order-differentiation-representative-value of the second line group to select one value equal to or larger than the other value; and
multiplying the selected value by a proportional constant equal to or larger than 1 to calculate the third-area-threshold-value.

27. The method of claim 17, wherein the aligning of the first area and the third area includes determining whether or not a beginning line of the detected first area and a beginning line of the third area are identical to each other.

28. The method of claim 17, wherein the detecting of the first area includes representing the detected first area with a binary code, the detecting of the third area includes representing the detected third area with a binary code, and the detecting of the transition area includes performing a logical operation on the binary code representing the first area and the binary code representing the third area.

29. The method of claim 17, further comprising, after the aligning of the first area and the third area and the detecting of the transition area, performing filtering on a boundary of the detected transition area.

30. An apparatus for processing an image, the apparatus comprising:

a line representative value calculator configured to calculate line representative values of an image including an image display area, a non-image display area, and a transition area interposed between the image display area and the non-image display area;

a transition area detector including a first area detection sub-unit configured to detect a first area using the calculated line representative values, a second area detection sub-unit configured to detect a second area using first-order differentiations of the calculated line representative values, and a transition area detection sub-unit configured to detect the transition area based on the first area and the second area; and an image processor configured to separately perform image processing on the non-image display area, the transition area, and the image display area of the image.

31. The apparatus of claim 30, wherein the transition area detector further includes a third area detection sub-unit configured to detect a third area by calculating second-order differentiations of the line representative values, and the image processor detects the transition area based on the third area together with the first area and the second area.

32. The apparatus of claim 30, further comprising a filter configured to perform filtering on a boundary of the detected transition area.

33. An apparatus for processing an image, the apparatus comprising:

a line representative value calculator configured to calculate line representative values of an image;

a first area detector configured to detect a first area using the calculated line representative values;

a third area detector configured to detect a third area using second-order differentiations of the calculated line representative values;

a transition area detector configured to detect a transition area based on the first area and the third area; and an image processor configured to separately perform image processing on an non-image display area, the transition area, and an image display area of the image.

34. The apparatus of claim 33, further comprising a filter configured to perform filtering on a boundary of the detected transition area.

* * * * *